(12) United States Patent
Anderson et al.

(10) Patent No.: US 11,759,919 B2
(45) Date of Patent: Sep. 19, 2023

(54) ADJUSTABLE SOCKET ASSEMBLY

(71) Applicants: Kurt Allan Anderson, Sioux Falls, SD (US); William Larsen, Sioux Falls, SD (US)

(72) Inventors: Kurt Allan Anderson, Sioux Falls, SD (US); William Larsen, Sioux Falls, SD (US)

( * ) Notice: Subject to any disclaimer, the term of this patent is extended or adjusted under 35 U.S.C. 154(b) by 329 days.

(21) Appl. No.: 17/149,803

(22) Filed: Jan. 15, 2021

(65) Prior Publication Data

US 2022/0226970 A1  Jul. 21, 2022

(51) Int. Cl.
*B25B 13/44* (2006.01)
*B25B 13/50* (2006.01)
*F16K 35/06* (2006.01)

(52) U.S. Cl.
CPC .............. *B25B 13/44* (2013.01); *B25B 13/50* (2013.01); *F16K 35/06* (2013.01)

(58) Field of Classification Search
CPC ......... B25B 13/10; B25B 13/28; B25B 13/30; B25B 13/44; B25B 13/48; B25B 13/50; B25B 23/10; B25B 23/108; B25B 27/18
See application file for complete search history.

(56) References Cited

U.S. PATENT DOCUMENTS

| | | | | |
|---|---|---|---|---|
| 1,413,444 | A | * | 4/1922 | Williams ................ B25B 13/44 81/114 |
| 3,210,836 | A | * | 10/1965 | Johanson ........... H05K 13/0491 279/51 |
| 5,664,467 | A | * | 9/1997 | Breeze .................... B25B 13/44 81/53.2 |
| 7,219,581 | B2 | * | 5/2007 | Tulloch .................... H01Q 3/02 279/51 |
| 7,878,092 | B1 | * | 2/2011 | Eby ........................ B25B 13/44 81/112 |
| 9,156,143 | B2 | * | 10/2015 | Chiriac ................... B25B 13/44 |
| 2006/0162504 | A1 | * | 7/2006 | George .................. B25B 13/44 81/90.2 |
| 2019/0308449 | A1 | * | 10/2019 | Bowden, Sr. .......... B25G 1/043 |

* cited by examiner

*Primary Examiner* — Orlando E Aviles
*Assistant Examiner* — J Stephen Taylor

(57) ABSTRACT

An adjustable socket assembly includes a collet having a first end, a second end, and a perimeter wall. The second end has a receiving aperture therein. The collet is divided into a plurality of sections. A sleeve has a bottom end that receives the collet. The sleeve has an interior surface that tapers inwardly and abuts the sections to move toward each other as the sleeve moves toward the second ends of the sections. A biasing member extends through a top end of the sleeve and engages each of the sections. The biasing member is actuated to bias the sleeve downward to close together the sections and engaged the valve actuator. An engagement head is attached to the upper end of the biasing member and engages a tool to rotate the collet.

12 Claims, 9 Drawing Sheets

ADJUSTABLE SOCKET ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to collet devices and more particularly pertains to a new collet device for engaging a valve actuator and in particular a valve actuator which may be corroded due being buried within soil for an extended period of time. Such valve actuators are used for gas lines and water lines and as they corrode, their edges become rounded and cannot be easily gripped by conventional sockets.

(2) Description of Related Art Including Information Disclosed Under 37 CFR 1.97 and 1.98

The prior art relates to collet devices that are used for clamping down on articles typically engaged by sockets such as bolt heads, nuts and other articles which are threadably coupled to another object. However, these devices are insufficient for handling larger valve actuators which not only are compromised by corrosion, but which require a very large amount of torque to be turned.

BRIEF SUMMARY OF THE INVENTION

An embodiment of the disclosure meets the needs presented above by generally comprising a collet having a first end, a second end, and a perimeter wall extending between the first and second ends. The second end has a receiving aperture extending therein. The first end has a well extending therein and is in communication with the receiving aperture. The receiving aperture is configured to receive a valve actuator such that an inner surface of the perimeter wall engages the valve actuator. The perimeter wall has an outer surface including an engagement portion. The engagement portion is angled outwardly as the engagement portion extends downwardly from the first end toward the second end. The perimeter wall of the collet has a plurality of breaks therein extending from the first end to the second end such that the collet comprises a plurality of sections that are discrete from each other. A sleeve has a bottom end and a top end. The bottom end is open and receives the collet such that the second end extends downwardly and outwardly away from the sleeve. The sleeve comprises a peripheral wall having an interior surface and an exterior surface. The interior surface tapers inwardly as the interior surface extends from the bottom end to the top end. The interior surface abuts the engagement portion of each of the sections and biases the second ends of the sections toward each other as the first end moves inward of the bottom end of the sleeve. A biasing member extends through the top end of the sleeve and engages each of the sections of the collet to retain the sections within the sleeve. The biasing member is actuated to bias the sleeve downward toward the second end of the collet such that the sections close together to engage the valve actuator. An engagement head is attached to the upper end of the biasing member and is configured to be engaged with a tool to rotate the collet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
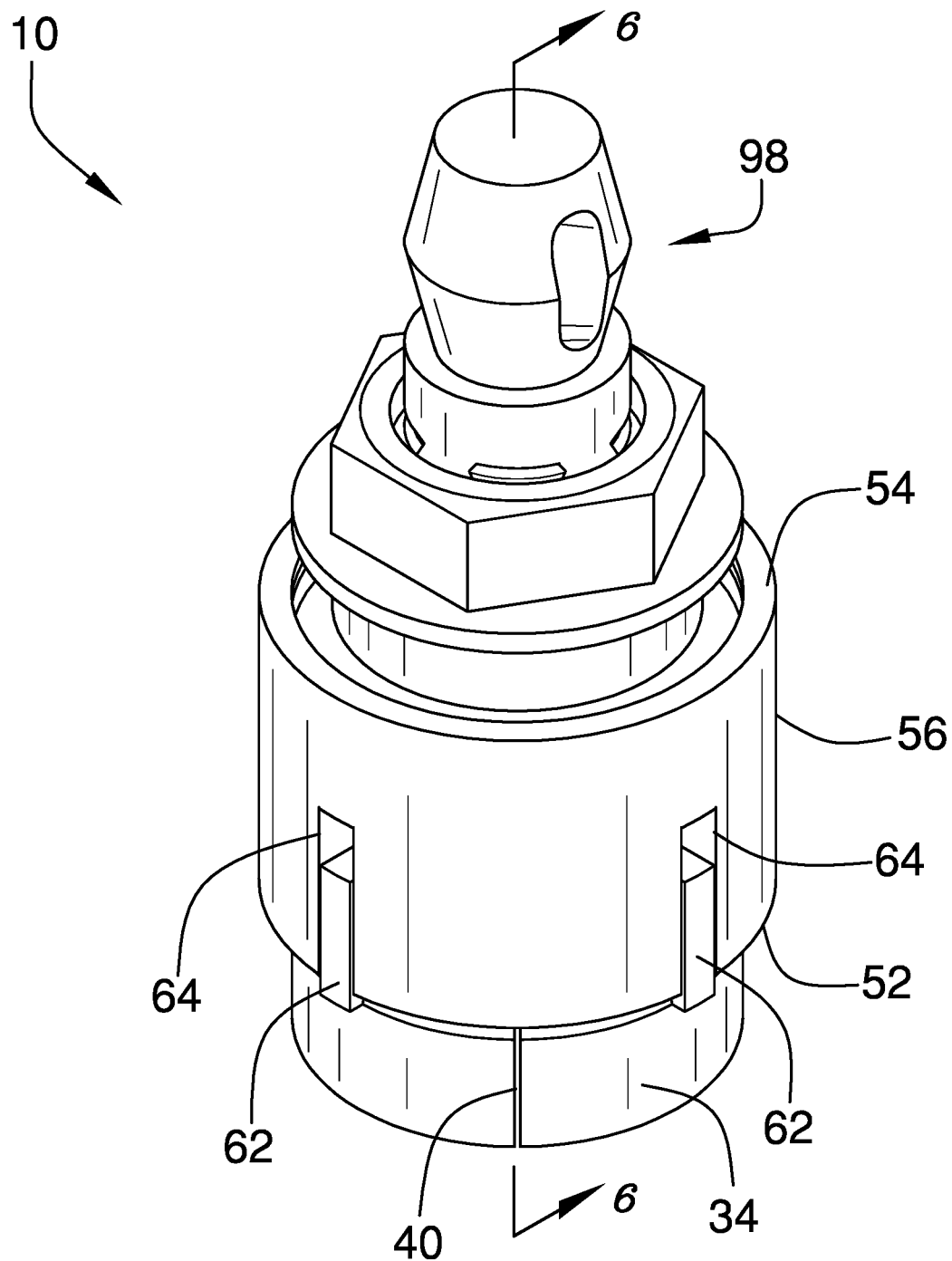
FIG. 1 is a front isometric view of a adjustable socket assembly according to an embodiment of the disclosure.
Figure 2:
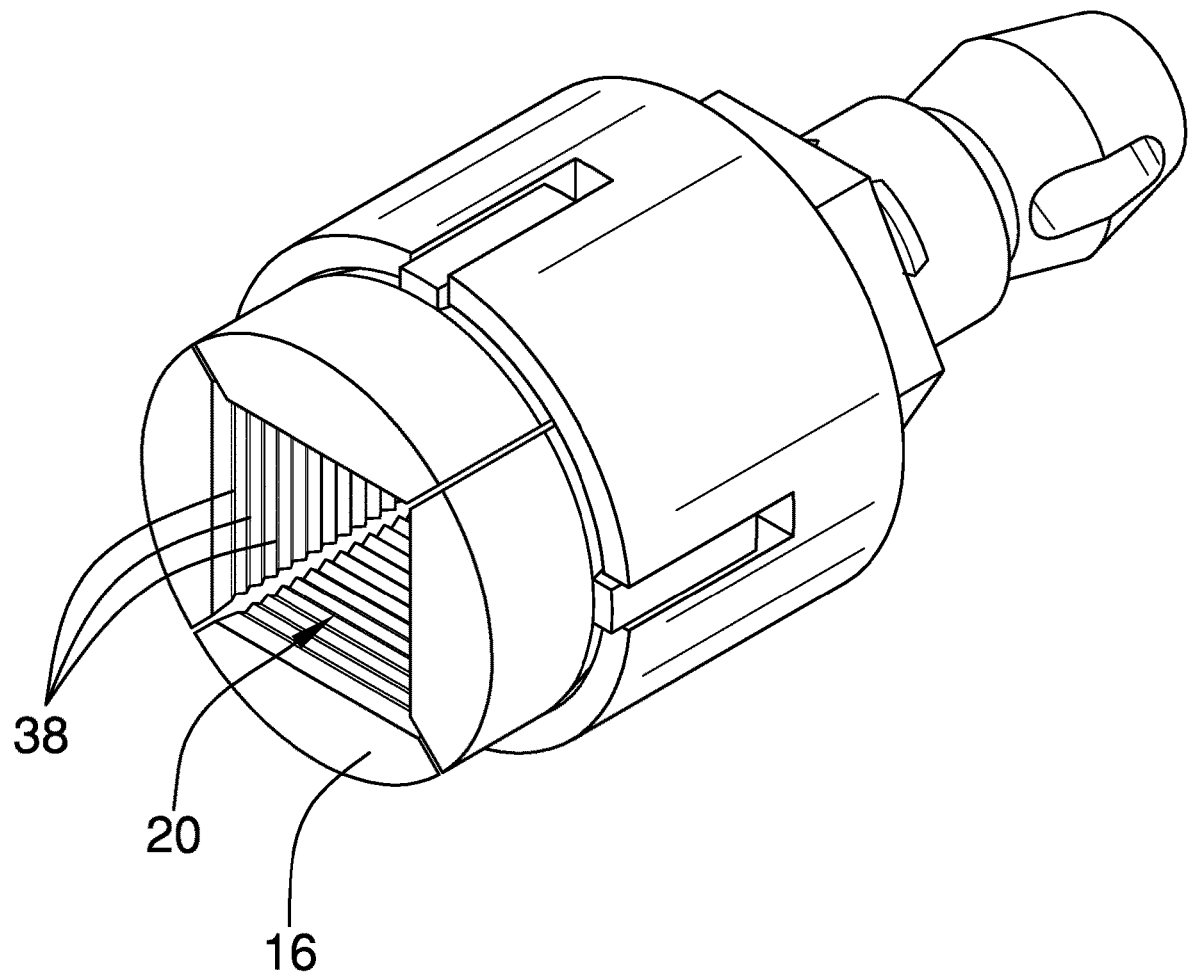
FIG. 2 is a bottom isometric view of an embodiment of the disclosure.

With reference now to the drawings, and in particular to FIGS. 1 through 10 thereof, a new collet devices embodying the principles and concepts of an embodiment of the disclosure and generally designated by the reference numeral 10 will be described.

As best illustrated in FIGS. 1 through 10, the adjustable socket assembly 10 generally comprises a collet 12, or a more particularly a collet type structure as will be described below, having a first end 14, a second end 16, and a perimeter wall 18 extending between the first 14 and second 16 ends. The second end 16 has a receiving aperture 20 extending therein. The first end 14 has a well 22 extending therein and is in communication with the receiving aperture 20. The receiving aperture 20 is configured to receive a valve actuator 24 such that an inner surface 26 of the perimeter wall 18 engages the valve actuator 24. The valve actuator 24 is typically a rectangular or other geometrically shaped valve actuator 24 extending away from, and often in an upwardly direction, a valve 28 in fluid communication with a pipe 30. The pipe 30 may carry any fluid or gas but in many particular instances the pipe 30 will often be a water pipe that is buried several feet below a surface of the ground.

A lip 32 is attached to the inner surface 26 and is positioned adjacent to the first end 14. The perimeter wall 18 has an outer surface 34 including a section defining an engagement portion 36 which will typically only include a portion of the outer surface 34 extending completely around the collet 12 and may be spaced from both of the first 14 and second 16 ends, though it could extend from the first end 14 to the second end 16. The engagement portion 36 is angled outwardly as the engagement portion 36 extends downwardly from the first end 14 toward the second end 16. That is, a diameter of the collet 12 generally increases as one moves along the outer surface 34 away from the first end 14 and toward the second end 16. The inner surface 26 of the receiving aperture 20 may include a plurality of teeth 38 thereon to enhance friction between the inner surface 26 and the valve actuator 24. The receiving aperture 20 will typically have a rectangular shape though other geometric shapes including pentagons, hexagons, octagons, triangles and the like may be utilized though circular shapes likely would not. Generally, the shape of the receiving aperture 20 will conform to the type and shape of the valve actuator 24 to be engaged.

Figure 3:
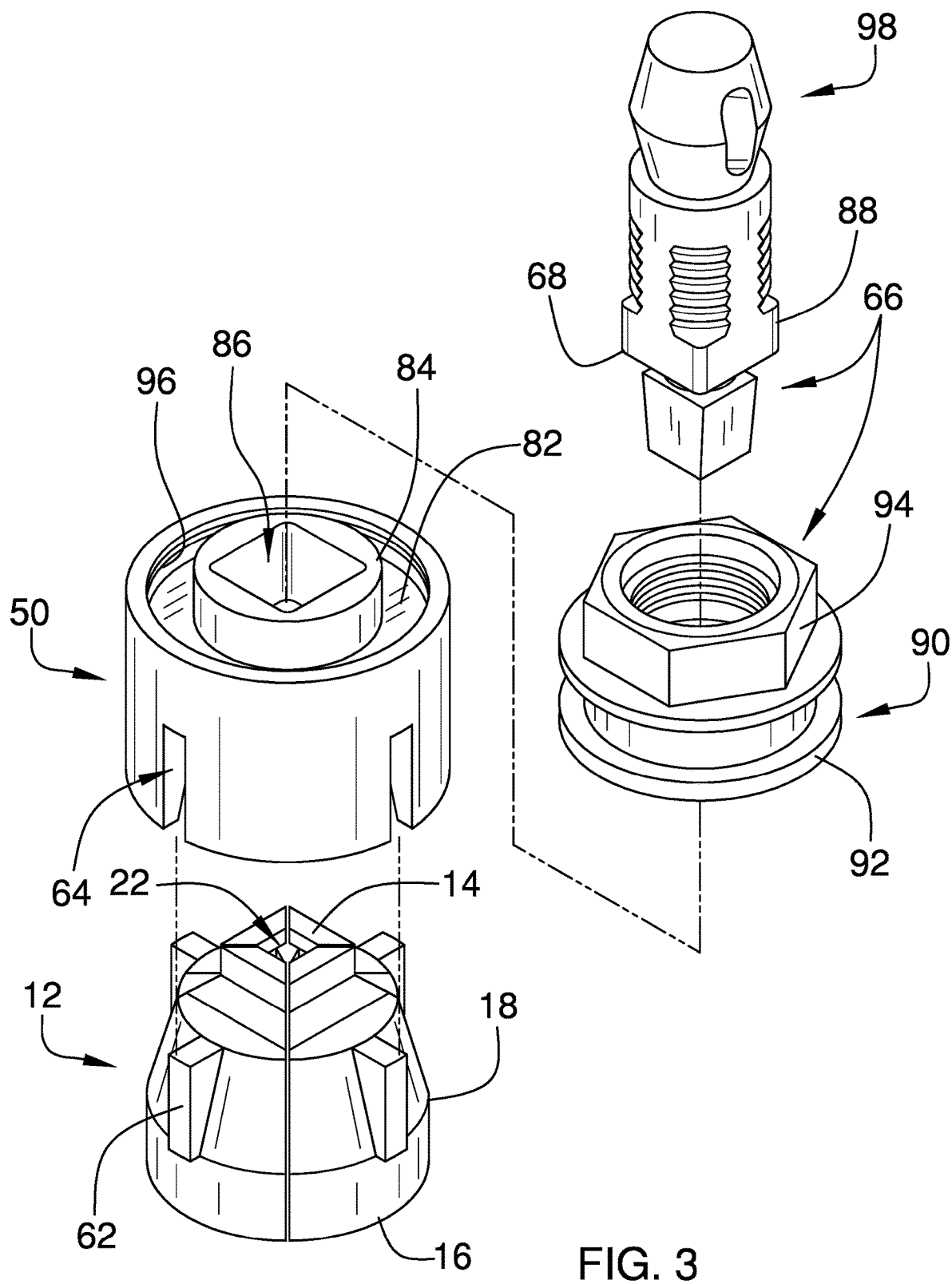
FIG. 3 is a rear exploded isometric view of an embodiment of the disclosure.
Figure 4:
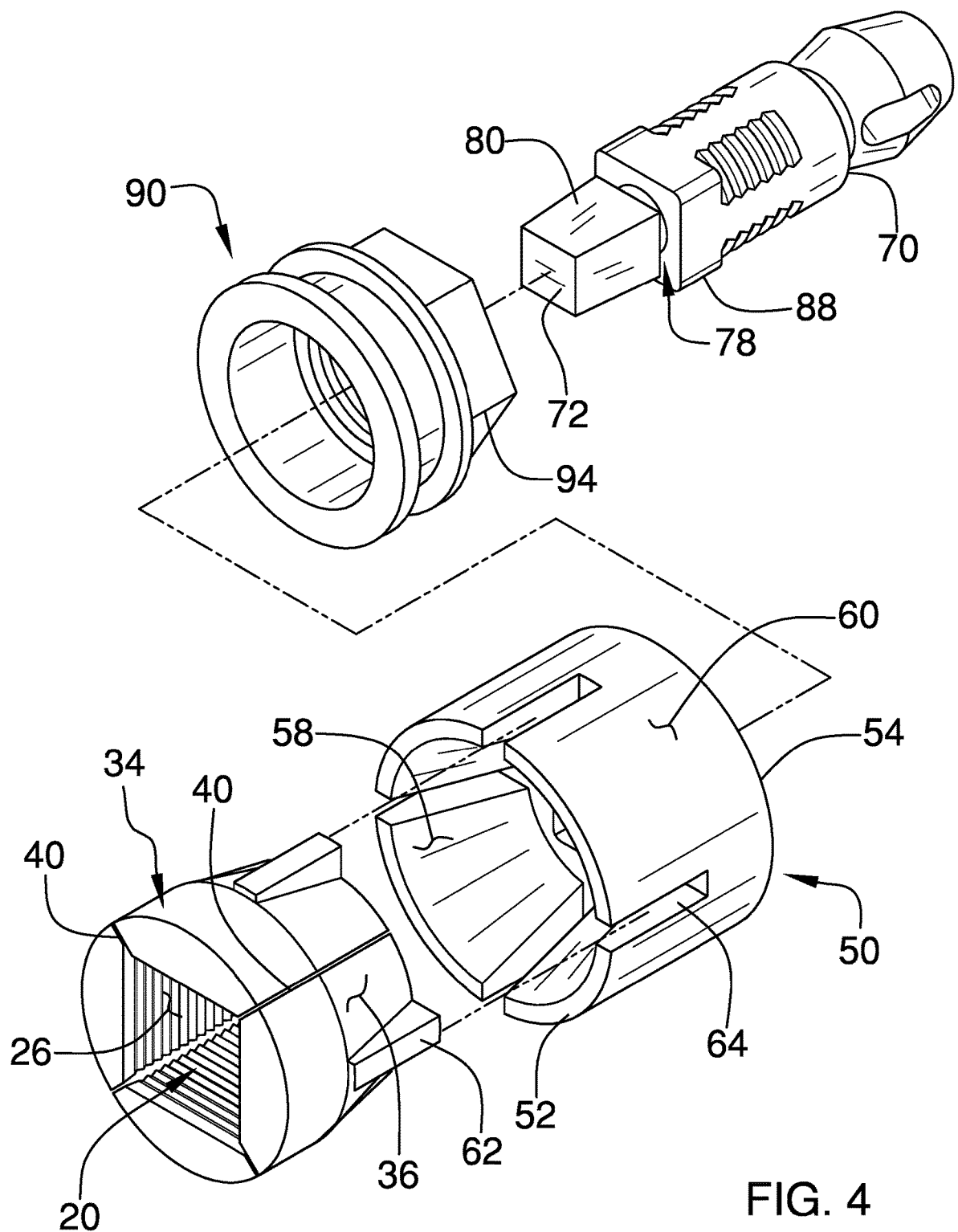
FIG. 4 is a bottom exploded isometric view of an embodiment of the disclosure.
Figure 5:
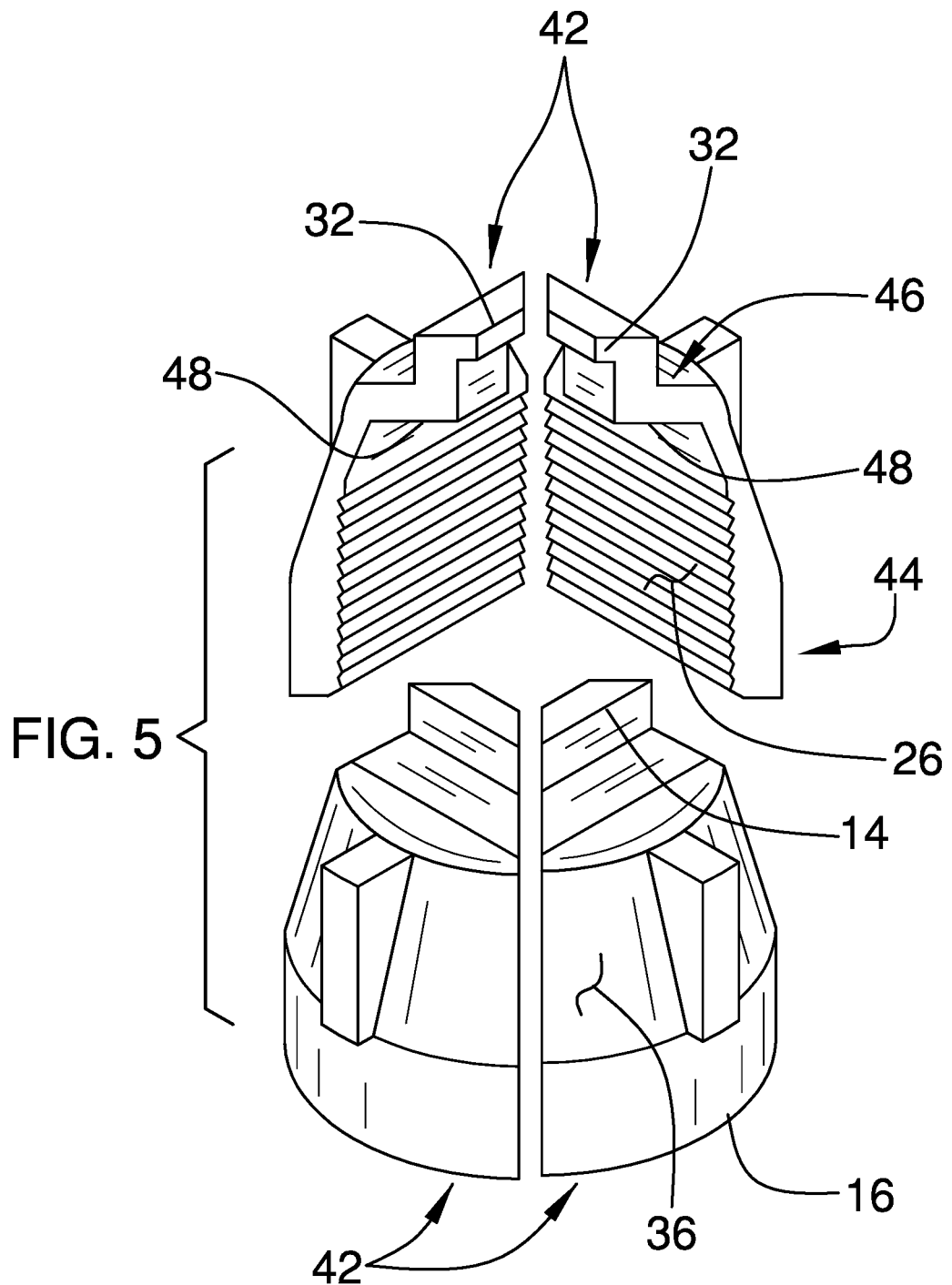
FIG. 5 is a side isometric view of a collet of an embodiment of the disclosure.

The perimeter wall 18 of the collet 12 has a plurality of breaks 40 therein extending from the first end 14 to the second end 16 such that the collet 12 comprises a plurality of sections 42 that are discrete from each other. That is, each section 42 is unattached to the remaining sections 42 such that each can float independently from each other as will be further understood below. The plurality of sections 42 is at two sections 42 and, as can be seen in the Figures, four sections 42 may be utilized, particularly when the receiving aperture 20 is rectangular shaped such that each section 42 includes one side of the rectangle. While the number of sections 42 may vary, there would generally be little reason to utilize more than eight sections 42. Each of the sections 42 includes a lower component 44 including the second end 16 and an upper component 46 including the first end 14. The lower component 44 includes the inner surface 26 of the receiving aperture 20. As can be seen in FIG. 5, the engagement portion 36 may traverse a juncture of the upper 46 and lower 44 components. A shoulder 48 extends away from the inner surface 26 and is spaced from the second end 16 and may be positioned above the lower component 44 to define a terminus of the receiving aperture 20. The shoulders 48 of the sections 42 when placed together form a non-circular geometric shape as seen in FIG. 3 for purposes which will be apparent below.

A sleeve 50 has a bottom end 52 and a top end 54. The bottom end 52 is open and receives the collet 12 such that the second end 16 extends downwardly and outwardly away from the sleeve 50. The sleeve 50 comprises a peripheral wall 56 having an interior surface 58 and an exterior surface 60. The interior surface 58 tapers inwardly as the interior surface 58 extends from the bottom end 52 to the top end 54. The interior surface 58 abuts the engagement portion 36 of each of the sections 42 and biases the lower components 44 toward each other as the first end 14 moves inward of the bottom end 52 of the sleeve 50. That is, the breaks 40 allow the sections 42 to be spaced from each other as shown in FIG. 5 but movement of the engagement portions 36 of the sections 42 upwardly against the sleeve 50 forced the sections 42 together.

Figure 6:
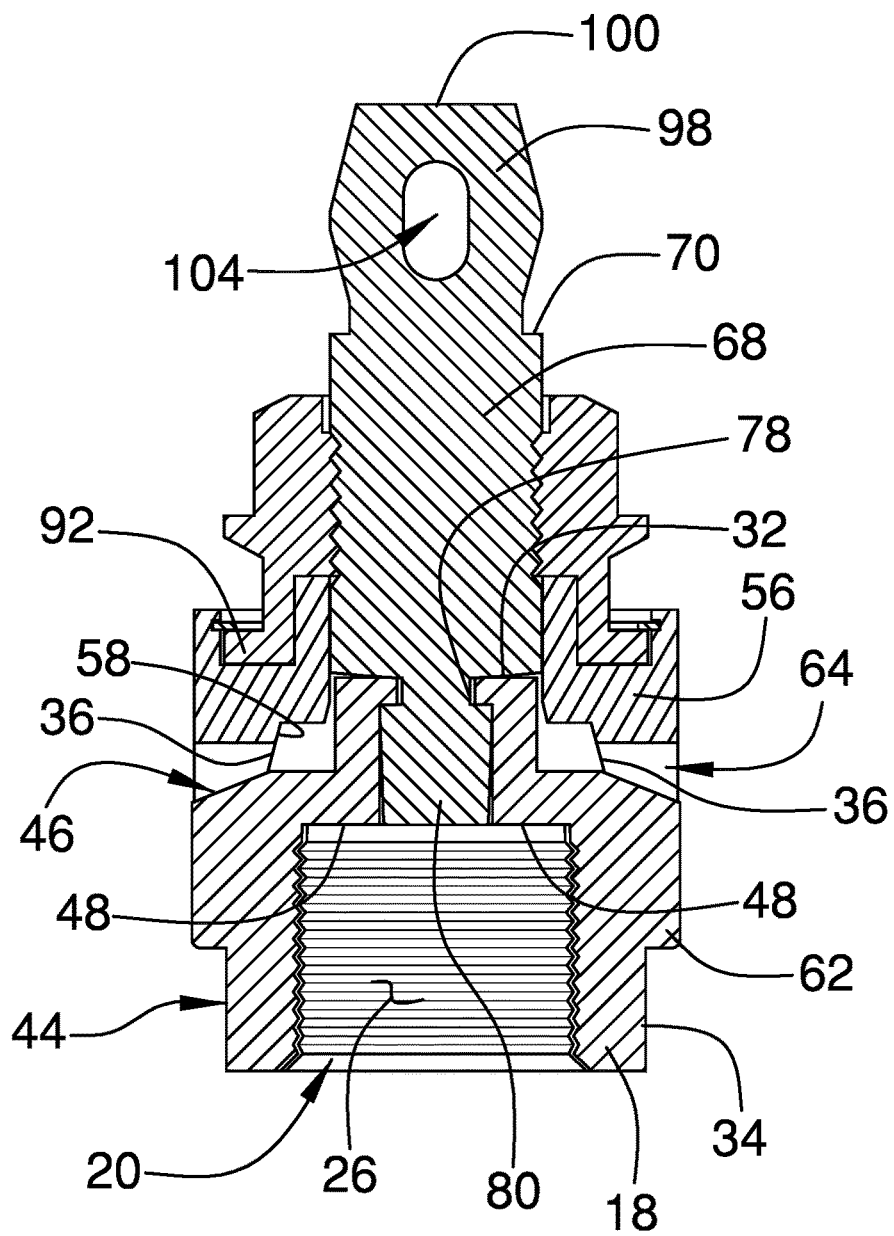
FIG. 6 is a cross-sectional view of an embodiment of the disclosure taken along line 6-6 of FIG. 1.

As can be seen in the Figures, the outer surface 36 of the collet 12, and in some cases the outer surfaces 36 of each section 42, includes a first mating member 62. The peripheral wall 56 includes a plurality of second mating members 64. Each of the second mating members 64 is engageable with a first mating member 62 on one of the sections 42 to prevent rotation of the collet 12 relative to the sleeve 50 as well as to stabilize the sections 42 relative to the sleeve 50 for easier assembly and usage. Each of the first mating members 62 may comprises an outwardly extending and vertically orientated plate. Each of the second mating members 64 may comprise a channel extending upwardly into the bottom end 52 and through the interior 58 and exterior 60 surfaces of the peripheral wall 56. As can be seen in FIG. 6, the plates extend into the channels and thereafter the sections 42 cannot rotate within the sleeve 50.

A biasing member 66 extends through the top end 54 of the sleeve 50 and engages the collet 12. The biasing member 66 is actuated to bias the sleeve 50 downward toward the second end 16 of the collet 12 to cause the receiving aperture 20 to constrict in size. The biasing member 66 includes a shaft 68 having an upper end 70 and a lower end 72. For explanatory purposes, the shaft 68 includes a lower portion 74 and an upper portion 76 and the shaft 68 extends through the first end 14 such that the lower portion 74 is positioned within the collet 12. The lower portion 74 includes an annular slot 78 therein at a juncture of the lower 74 and upper 76 portions to define a protuberance 80 positioned between the annular slot 78 and the lower end 72. The lip 32 is extendable into the annular slot 78, which may comprise a number of indents instead of an annular slot extending around the shaft 68, to engage the shaft 68 with the collet 12 to retain the collet 12 in connection with the shaft 68. This is best shown in FIG. 6 where the protuberance 80 abuts the inner surface 26 of the perimeter wall of the shoulder(s) 48 while the lip 32 extends into the annular slot 78. The protuberance 80 of the shaft 68 has a shape such that the shaft 68 is in a rotationally static condition with the respect to the collet 12. As can be seen from the Figures and in particular in FIG. 7, in this embodiment the protuberance 80 has a rectangular cross-section taken perpendicular to a line extending through the upper 70 and lower 72 ends to match a generally rectangular shape of the opening formed by the shoulders 48.

FIG. 3 shows the sleeve 50 top end 70 being open but including a top wall 82 with a barrier 84 bounded tubular passage 86 extending therethrough. The tubular passage 86 has a rectangular shape. The shaft 68 includes a locking section 88 positioned above the annular slot 78 having a matching shape to the tubular passage 86 to allow the shaft 68 to slide through the tubular passage 86 but not rotate with respect to it. This structure further stabilizes the shaft 68 relative to the collet 12 and the sleeve 50 to prevent rotation of the shaft 68 relative to the sleeve 50 and collet 12.

A nut 90 is threadably coupled to the upper portion 76 of the shaft 68 and is abutted against the top end 54, or top wall 82, of the sleeve 50. The nut 90 moves the sleeve 50 downward relative to the shaft 68 when the nut 90 is rotated in a first direction such that the shaft 68 is urged upwardly and pulls the collet 12 inwardly of the sleeve 50. The collet 12 is closable and frictionally engageable with the valve actuator 24 when the nut 90 is rotated in the first direction. The shaft 68 is moved downwardly and allows the collet 12 to fall outwardly of the sleeve 50 when the nut 90 is rotated in a second direction to release the valve actuator 24. The nut 90 may include a flange 92 seated within a space between a ridge 96 extending upwardly from the peripheral wall 56 and tubular passage 86 to facilitate the retention of the nut 90 on the sleeve 50. A lateral gripping surface 94 of the nut 90 may have any conventional shape, such as hexagonal seen in FIG. 1, such that it can be gripped by a socket or wrench type-head. Shown in FIG. 6 is a washer that may be positioned above the flange 92 and embedded into the ridge 96 to retain the nut 90 on the sleeve 50, however alternate structures may be used to secure the nut 90 in rotational connection with the sleeve 50.

Figure 7:
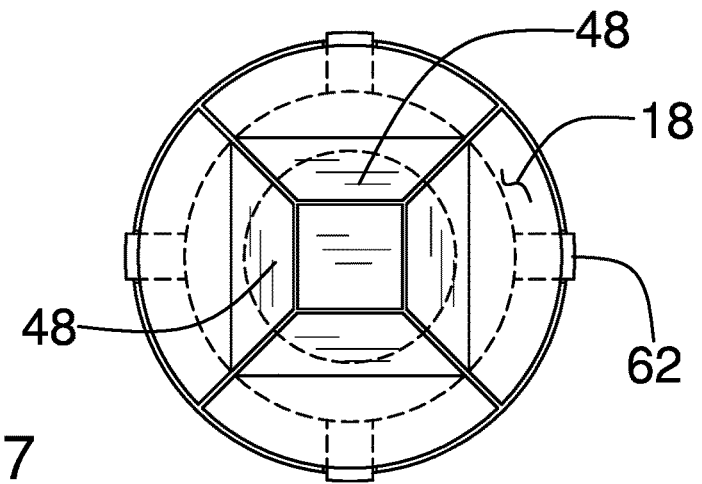
FIG. 7 is a bottom view of an embodiment of the disclosure.
Figure 8:
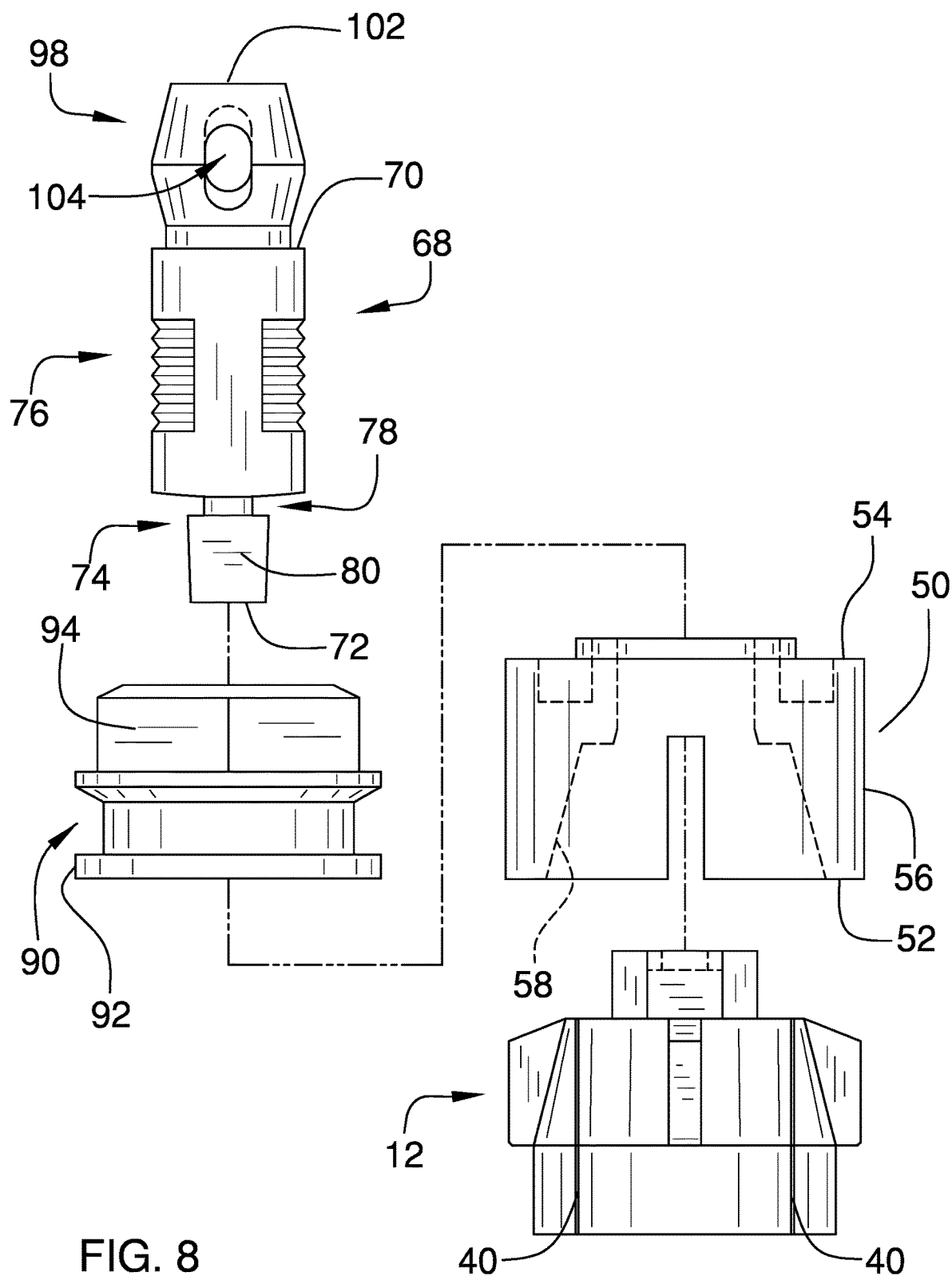
FIG. 8 is a side exploded view of an embodiment of the disclosure.
Figure 9:
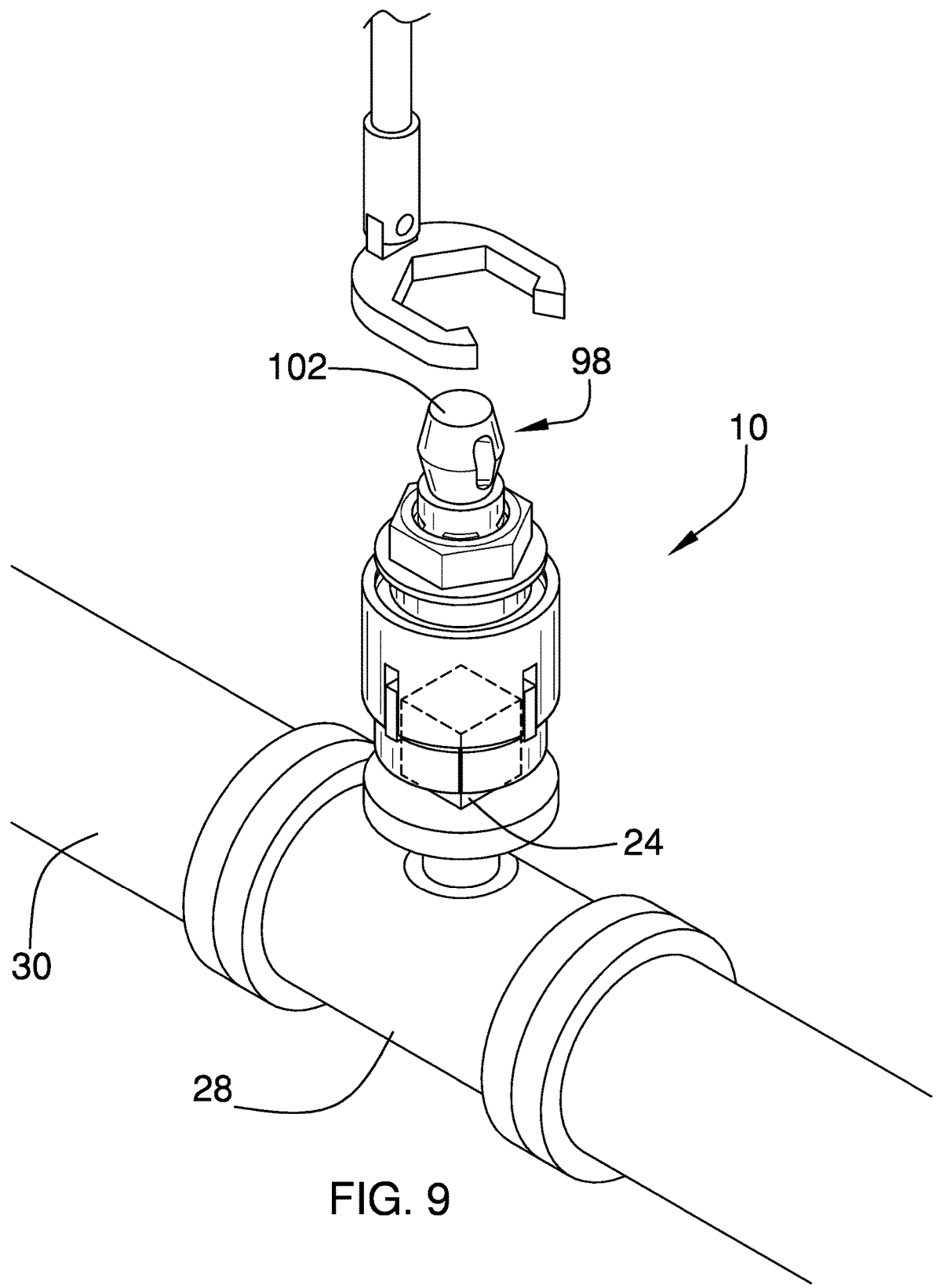
FIG. 9 is a top and side isometric in-use view of an embodiment of the disclosure.
Figure 10:
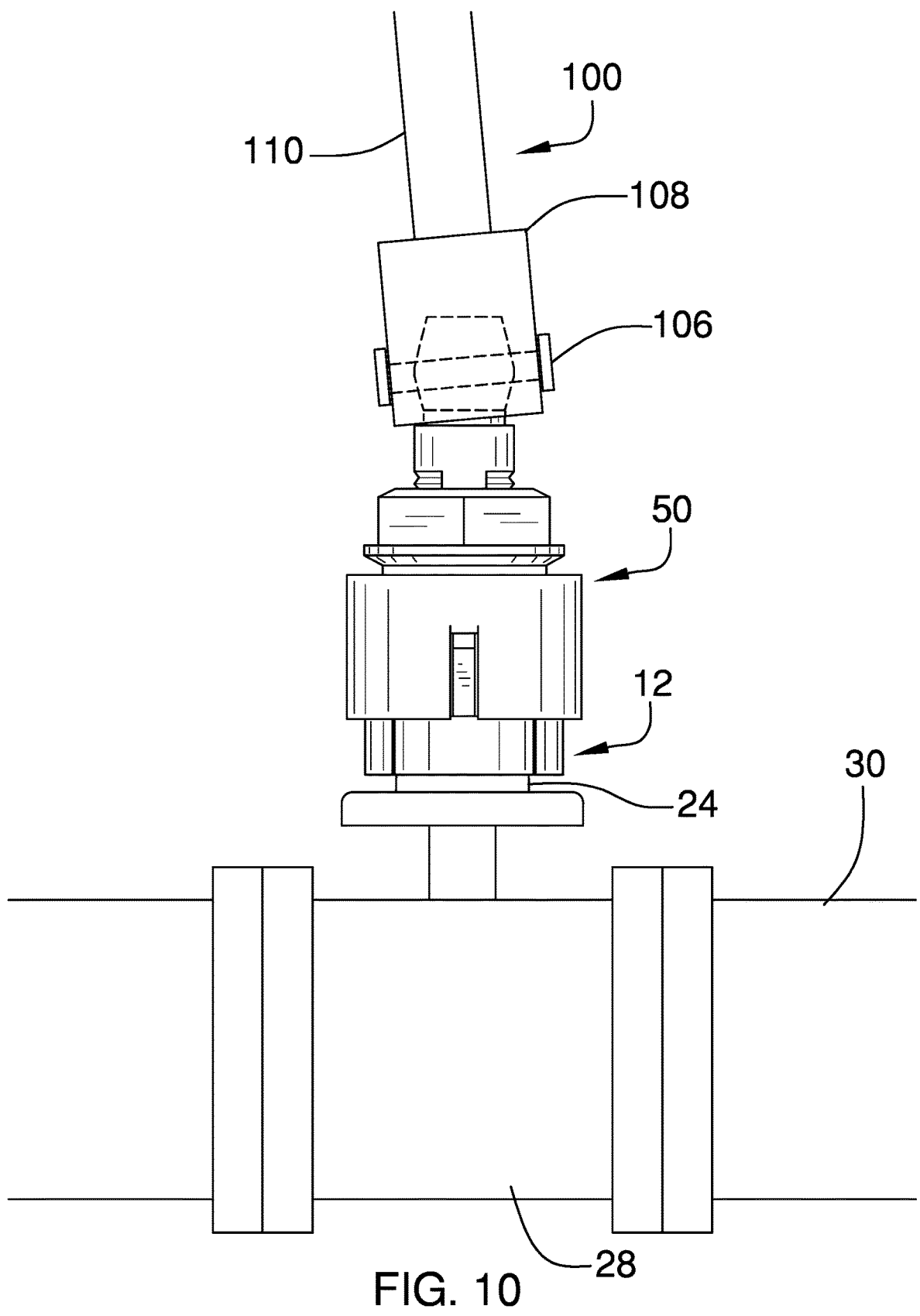
FIG. 10 is a side in-use view of an embodiment of the disclosure.

An engagement head 98 is attached to the upper end 70 of the shaft 68 and the engagement head 98 is configured to be engaged with a tool 100 to rotate the shaft 68 and collet 12. The engagement head 98 and upper end 70 of the shaft 68 will typically comprise a unitary structure. The engagement head 98 may include an outer surface engageable with a socket, wrench or other similar tool. Alternatively, a distal end 102 of the engagement head 98 relative to the shaft 68 may have a threaded or geometrically shaped well extending therein for receiving a tool that can then couple to the shaft 68. FIG. 8 shows an engagement head having an opening 104 extending laterally through the engagement head 98. The opening 104 may be vertically elongated as can be seen in FIG. 7. This allows a pin 106 extending through opening 104 to have some ability to swivel out of a horizontal plane if needed. The pin 106 is then attached to an engagement head receiver 108 which in turn is secured to an elongated rod 110. The rod 110 may then be rotated by a motor driven mechanism to create enough torque required to rotate the valve actuator 24.

All structural components of the assembly 10 will typically comprise the same materials as each other such as being machined from steel alloys, though any conventional materials used for sockets, wrenches and the like may be utilized. The size of the collet 12, sleeve 50 and, to some extent, the shaft 68, will be dependent upon the size of the valve actuator 24 and the amount of torque the assembly 10 will be subjected to. Since the elongated rod 110 will likely be driven by machine power instead of human power, the components may have a thickness and material characteristics to withstand torque forces subjected by the elongated rod 110 in excess of 1000 lbs. The receiving aperture 20, when fully closed, will typically have a diameter in excess of 0.5 inches and less than 4.0 inches, and a depth greater than 0.5 inches In use, the assembly 10 is lowered onto the valve actuator 24 such that it extends into the receiving aperture 20 of the collet 12. The nut 90 is then tightened such that the shaft 68 is lifted upwardly causing the engagement portions 36 of the sections 42 of the collet 12 to move upwardly along the interior surface 58 of the sleeve 50 wherein the interior surface 58 of the sleeve 50 urges the second ends 16 of the sections 42 toward each other to close the collet 12. This closing of the sections 42 toward each other increases the friction between the collet 12 and the valve actuator 24. This may be required as the valve actuator 24, typically being buried in soil, may be corroded and therefore its once squared edges may have become rounded. The teeth 38 on the interior surface 26 enhance the friction between the collet 12 and the valve actuator 24. After the nut 90 has been tightened to its maximum limit, the rod 110, which may have already been coupled to the engagement head 108, is rotated to turn the valve actuator 24. When the required task is complete the nut 90 is loosened to release the collet 12 from the valve actuator 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An adjustable valve socket assembly configured to engage a valve actuator, the assembly comprising:
   a collet having a first end, a second end, and a perimeter wall extending between the first and second ends, the second end having a receiving aperture extending therein, the first end having a well extending therein and being in communication with the receiving aperture, the receiving aperture being configured to receive a valve actuator such that an inner surface of the perimeter wall engages the valve actuator, the perimeter wall having an outer surface, the outer surface including an engagement portion, the engagement portion being angled outwardly as the engagement portion extends downwardly from the first end toward the second end, the collet including a lip being attached to the inner surface and being positioned adjacent to the first end;
   the perimeter wall of the collet having a plurality of breaks therein extending from the first end to the second end such that the collet comprises a plurality of sections being discrete from each other;
   a sleeve having a bottom end and a top end, the bottom end being open and receiving the collet such that the second end extends downwardly and outwardly away from the sleeve, the sleeve comprising a peripheral wall having an interior surface and an exterior surface, the interior surface tapering inwardly as the interior surface extends from the bottom end to the top end, the interior surface abutting the engagement portion and biasing the second ends of the sections toward each other as the first end moves inward of the bottom end of the sleeve;

a biasing member extending through the top end of the sleeve and engaging each of the sections of the collet to retain the sections within the sleeve, the biasing member being actuated to bias the sleeve downward toward the second end of the collet such that the sections close together to engage the valve actuator, the biasing member including a shaft extending into the first end of the collet, the shaft including an annular slot therein, the lip being extendable into the annular slot to engage the shaft with the collet to retain the collet in connection with the shaft; and an engagement head being attached to the upper end of the biasing member, the engagement head being configured to be engaged with a tool to rotate the collet.

2. The adjustable valve socket assembly according to claim 1, wherein an inner surface of the receiving aperture has a plurality of teeth thereon to enhance friction between the inner surface of the receiving aperture and the valve actuator.

3. The adjustable valve socket assembly according to claim 1, wherein the receiving aperture has a rectangular shape.

4. The adjustable valve socket assembly according to claim 1, wherein each of the sections further includes:
    a lower component including the second end and an upper component including the first end, the lower component including the inner surface of the receiving aperture;
    a shoulder extending away from the inner surface and being spaced from the second end, the shoulder being positioned above the lower component and defining a terminus of the receiving aperture, the shaft abutting the shoulder to prevent rotation of the shaft relative to the collet.

5. The adjustable valve socket assembly according to claim 4, wherein the outer surface of the perimeter wall includes a first mating member, the sleeve including a second mating member being releasably engaged with the first mating member to prevent rotation of the sleeve relative to the collet.

6. The adjustable valve socket assembly according to claim 5, wherein the first mating member comprises an outwardly extending and vertically orientated plate, the second mating member comprising a channel extending upwardly into the bottom end and through the interior and exterior surfaces of the peripheral wall.

7. The adjustable valve socket assembly according to claim 1, wherein the outer surface of the perimeter wall includes a first mating member, the sleeve including a second mating member being releasably engaged with the first mating member to prevent rotation of the sleeve relative to the collet.

8. The adjustable valve socket assembly according to claim 7, wherein the first mating member comprises an outwardly extending and vertically orientated plate, the second mating member comprising a channel extending upwardly into the bottom end and through the interior and exterior surfaces of the peripheral wall.

9. The adjustable valve socket assembly according to claim 1, further including:
    the lip of the collet being attached to the inner surface and being positioned adjacent to the first end;
    each of the sections including:
        a lower component including the second end and an upper component including the first end, the lower component including the inner surface of the receiving aperture;
        a shoulder extending away from the inner surface and being spaced from the second end, the shoulder being positioned above the lower component and defining a terminus of the receiving aperture;
    wherein the biasing member includes:
        the shaft having an upper end and a lower end, the shaft including a lower portion and an upper portion, the shaft extending through the first end such that the lower portion is positioned within the collet, the lower portion including the annular slot therein at a juncture of the lower and upper portions to define a protuberance positioned between the annular slot and the lower end, the lip being extendable into the annular slot to engage the shaft with the collet to retain the collet in connection with the shaft, the protuberance abutting the inner surface of the shoulder and having a shape such that the shaft is in a rotationally static condition with the respect to the collet;
        a nut being threadably coupled to the upper portion and being abutted against the top end of the sleeve, the nut moving the sleeve downward relative to the shaft when the nut is rotated in a first direction such that the shaft is urged upwardly and pulling the collet inwardly of the sleeve, wherein the collet is closable and frictionally engageable with the valve actuator when the nut is rotated in the first direction, the shaft being moved downwardly and allowing the collet to fall outwardly of the sleeve when the nut is rotated in a second direction to release the valve actuator.

10. The adjustable valve socket assembly according to claim 9, wherein the outer surface of the perimeter wall of each section includes a first mating member, the sleeve including a plurality of second mating members, the second mating members each being releasably engaged with one of the first mating members to prevent rotation of the sleeve relative to the collet.

11. The adjustable valve socket assembly according to claim 10, wherein each first mating member comprises an outwardly extending and vertically orientated plate, each second mating member comprising a channel extending upwardly into the bottom end and through the interior and exterior surfaces of the peripheral wall.

12. An adjustable valve socket assembly configured to engage a valve actuator, the assembly comprising:
    a collet having a first end, a second end, and a perimeter wall extending between the first and second ends, the second end having a receiving aperture extending therein, the first end having a well extending therein and being in communication with the receiving aperture, the receiving aperture being configured to receive a valve actuator such that an inner surface of the perimeter wall engages the valve actuator, a lip being attached to the inner surface and being positioned adjacent to the first end, the perimeter wall having an outer surface, the outer surface including an engagement portion, the engagement portion being angled outwardly as the engagement portion extends downwardly from the first end toward the second end, a inner surface of the receiving aperture having a plurality of teeth thereon to enhance friction between the inner surface and the valve actuator, the receiving aperture having a rectangular shape;
    the perimeter wall of the collet having a plurality of breaks therein extending from the first end to the second end such that the collet comprises a plurality of sections being discrete from each other, each of the sections including:
  a lower component including the second end and an upper component including the first end, the lower component including the inner surface of the receiving aperture;
  a shoulder extending away from the inner surface of the perimeter wall and being spaced from the second end, the shoulder being positioned above the lower component and defining a terminus of the receiving aperture;
  the outer surface including a plurality of first mating members;
a sleeve having a bottom end and a top end, the bottom end being open and receiving the collet such that the second end extends downwardly and outwardly away from the sleeve, the sleeve comprising a peripheral wall having an interior surface and an exterior surface, the interior surface tapering inwardly as the interior surface extends from the bottom end to the top end, the interior surface abutting the engagement portion and biasing the lower components toward each other as the first end moves inward of the bottom end of the sleeve, the peripheral wall including a plurality of second mating members, each of the second mating members being engageable with one of the first mating members on one of the sections to prevent rotation of the collet relative to the sleeve, each of the first mating members comprising an outwardly extending and vertically orientated plate, each of the second mating members comprising a channel extending upwardly into the bottom end and through the interior and exterior surfaces of the peripheral wall;
a biasing member extending through the top end of the sleeve and engaging the collet, the biasing member being actuated to bias the sleeve downward toward the second end of the collet, the biasing member including:
  a shaft having an upper end and a lower end, the shaft including a lower portion and an upper portion, the shaft extending through the first end such that the lower portion is positioned within the collet, the lower portion including an annular slot therein at a juncture of the lower and upper portions to define a protuberance positioned between the annular slot and the lower end, the lip being extendable into the annular slot to engage the shaft with the collet to retain the collet in connection with the shaft, the protuberance abutting the inner surface of the perimeter wall and having a shape such that the shaft is in a rotationally static condition with the respect to the collet;
  a nut being threadably coupled to the upper portion and being abutted against the top end of the sleeve, the nut moving the sleeve downward relative to the shaft when the nut is rotated in a first direction such that the shaft is urged upwardly and pulling the collet inwardly of the sleeve, wherein the collet is closable and frictionally engageable with the valve actuator when the nut is rotated in the first direction, the shaft being moved downwardly and allowing the collet to fall outwardly of the sleeve when the nut is rotated in a second direction to release the valve actuator; and
an engagement head being attached to the upper end of the shaft, the engagement head being configured to be engaged with a tool to rotate the shaft and collet.

* * * * *